(12) United States Patent
Känsälä et al.

(10) Patent No.: US 7,400,250 B2
(45) Date of Patent: Jul. 15, 2008

(54) INDICATING RADIO FREQUENCY IDENTIFICATION (RF-ID) TAG

(75) Inventors: Ilkka Känsälä, Oulu (FI); Heikki Huomo, Oulu (FI)

(73) Assignee: Nokia Corporation, Espoo (FI)

(*) Notice: Subject to any disclaimer, the term of this patent is extended or adjusted under 35 U.S.C. 154(b) by 307 days.

(21) Appl. No.: 11/117,333

(22) Filed: Apr. 29, 2005

(65) Prior Publication Data

US 2006/0244592 A1 Nov. 2, 2006

(51) Int. Cl.
*G08B 13/14* (2006.01)

(52) U.S. Cl. ............ 340/572.1; 340/10.1; 235/385

(58) Field of Classification Search .......... 340/572.1
See application file for complete search history.

(56) References Cited

U.S. PATENT DOCUMENTS

| | | | |
|---|---|---|---|
| 6,104,333 A | 8/2000 | Wood, Jr. | |
| 6,130,623 A | 10/2000 | MacLellan et al. | |
| 6,282,407 B1 | 8/2001 | Vega et al. | |
| 6,297,737 B1 * | 10/2001 | Irvin | 340/571 |
| 6,404,339 B1 * | 6/2002 | Eberhardt | 340/572.1 |
| 6,456,039 B1 | 9/2002 | Lauper et al. | |
| 6,462,647 B1 | 10/2002 | Roz | 340/10.1 |
| 6,566,997 B1 * | 5/2003 | Bradin | 340/10.2 |
| 6,690,402 B1 * | 2/2004 | Waller et al. | 715/850 |
| 6,892,052 B2 | 5/2005 | Kotola et al. | |
| 6,989,741 B2 * | 1/2006 | Kenny et al. | 340/505 |
| 7,049,963 B2 * | 5/2006 | Waterhouse et al. | 340/572.1 |
| 7,152,040 B1 * | 12/2006 | Hawthorne et al. | 340/522 |
| 2001/0007815 A1 | 7/2001 | Phillipsson | |
| 2002/0106988 A1 * | 8/2002 | Davie et al. | 455/39 |
| 2002/0154607 A1 | 10/2002 | Forstadius et al. | |
| 2003/0008647 A1 | 1/2003 | Takatori et al. | |
| 2003/0030542 A1 | 2/2003 | Von Hoffmann | 340/5.61 |

(Continued)

FOREIGN PATENT DOCUMENTS

WO     WO 01/39108 A2     5/2001

(Continued)

OTHER PUBLICATIONS

U.S. Appl. No. 10/105,320, Mar. 26, 2002, Kotola et al.

(Continued)

*Primary Examiner*—George A Bugg
*Assistant Examiner*—Eric M Blount
(74) *Attorney, Agent, or Firm*—Morgan & Finnegan, L.L.P.

(57) ABSTRACT

A RF-ID tag, preferably passive, provides an event indicating the tag has been successfully interrogated by a reader for data transmission. The event may be voice, light, color, vibration, odor, or different combinations of event indicators. The tag includes an antenna linked to a micro processor and a memory. A non-linear device and for example a light emitting device (LED) are coupled to the microprocessor and memory as an indicator circuit. The reader transmits electromagnetic energy received by the tag antenna when within the reader transmission zone. The energy is sufficient for the tag to transmit data from the memory to the reader. As the tag is read by the reader, the data stream includes a few bytes at the end to indicate the reading was successful. The reader energy is also sufficient to cause the illumination of the LED providing a tag indication that a successful tag transmission has occurred.

38 Claims, 5 Drawing Sheets

U.S. PATENT DOCUMENTS

| | | | |
|---|---|---|---|
| 2003/0114104 A1 | 6/2003 | Want et al. | |
| 2004/0164166 A1* | 8/2004 | Mahany et al. | 235/472.02 |
| 2005/0134461 A1* | 6/2005 | Gelbman et al. | 340/572.8 |
| 2005/0269411 A1* | 12/2005 | Vesikivi et al. | 235/462.01 |
| 2006/0132310 A1* | 6/2006 | Cox et al. | 340/572.1 |
| 2006/0145865 A1* | 7/2006 | Forster | 340/572.8 |

FOREIGN PATENT DOCUMENTS

| | | |
|---|---|---|
| WO | WO 01/45038 A2 | 6/2001 |
| WO | WO 01/45319 A1 | 6/2001 |

OTHER PUBLICATIONS

U.S. Appl. No. 10/804,081, Mar. 19, 2004, Kotola et al.

"Radio Frequency Identification—RF-ID: A Basic Primer", Automatic Indentification Manufactures (AIM) web site (http://www.aimglobal.org), Jan. 5, 2000, pp. 1-15.

Bray, et al., "Bluetooth Connect Without Cable", Prentice Hall PTR, ISBN 0-13-066106-6, pp. 71-87, 2000.

Charles Arehart, et al., "Professional WAP", Wrox Press Ltd., 2000 (ISBN 1-861004-04-1) pp. 1-41.

* cited by examiner

INDICATING RADIO FREQUENCY IDENTIFICATION (RF-ID) TAG

RELATED APPLICATIONS (1) Ser. No. 10/105,320, filed Mar. 26, 2002 entitled "RADIO FREQUENCY IDENTIFICATION (RF-ID) BASED DISCOVERY FOR SHORT RANGE RADIO COMMUNICATION", assigned to the same assignee as that of the present invention and fully incorporated herein;

(2) Ser. No. 10/804,081, filed Mar. 19, 2004 entitled "RADIO FREQUENCY IDENTIFICATION (RF-ID) BASED DISCOVERY FOR SHORT RANGE RADIO COMMUNICATION WITH READER DEVICE HAVING TRANSPONDER FUNCTIONALITY", assigned to the same assignee as that of the present invention and fully incorporated herein.

BACKGROUND OF THE INVENTION

1. Field of Invention

This invention relates to Radio Frequency Identification (RF-ID). More particularly, the invention relates to indicating RF-ID tags devices, methods and systems for Near Field Communication (NFC).

2. Description of Prior Art

Radio Frequency Identification (RF-ID) is a wireless system that automatically identifies tracks and manages objects via a fast connection between the object and a RF-ID reader. RF-ID principles are described in a publication entitled "Radio Frequency Identification RF-ID: A Basic Primer", published by the Automatic Identification Manufacturers (AIM), 125 Warrendale-Bayne Road, Warrendale, Pa. 15086, Oct. 23, 2001 and fully incorporated herein by reference. RF-ID tags are also used in Near Field Communication (NFC), which is a combination of RF-ID and interconnection technologies, making it possible to connect any two devices to exchange information or access content and services simply by bringing them close together, e.g. touching each other. Further details on NFC can be obtained from the NFC Forum, 401 Edgewater Place, Suite 601, Waefield, Mass. 01880, USA.

The rising use of RF-ID tags promotes standardization efforts to establish a broadly applicable communication framework between RF-ID tag readers and RF-ID tags. Such a standard is established by European Computer Manufacturers Association (ECMA) International, Geneva, Switzerland in a Near Field Communication (NFC) standard (ECMA-340) dated December 2002. The standard defines communication modes for a near field communication interface and protocol (NFCIP-1) to be used for RF-ID tag readers and RF-ID tags. It also defines both passive and active communication modes to realize a communication network using near field communication enabled devices for networked products and also for consumer equipment. The standard specifies, in particular, modulation schemes, codings, transfer speeds, and frame format of a Radio Frequency/High Frequency (RF/HF) interface, as well as initialization schemes and conditions required for data collision control during initialization. The ECMA Standard also defines a transport protocol including protocol activation and data exchange methods.

In RF-ID systems, an object to be detected, e.g. products, goods, people, etc includes a transponder, as a RF-ID tag, which may be "active" or "passive", the former including an energy source and the latter relying on received electromagnetic energy to generate a response to a reader interrogation. The tag broadcasts an object identity signal when in the presence of an electromagnetic zone created by the reader. The reader senses and decodes the broadcast signal containing information to identify the object. The object identity is achieved by a connectionless communication that is a connection without a logical connection between the reader and the object. Typically, the reader has a display, where a user can see if the information downloaded from the transponder has been successful or not. In other instances, a user receives immediate response in the form of services, e.g. a door opening.

In those instances where a reader does not contain an output feature, such as a display or provide services, there is a need to know whether an identity signal from a tag has been received by the reader and successful transmission of data from the tag to the reader has occurred. Without such indication, the tag identification process may be unnecessarily repeated, possibly overloading or delaying the reader operation. Thus, a need exists for faster and stronger indication when a RF-ID tag action or a Near Field Communication has been established and completed. Preferably, the tag itself can generate an event and provide feedback to the user that the tag has been successfully interrogated by the reader for the transfer of tag data.

Prior art related to indicating RF-ID tags, includes:

1. U.S. Pat. No. 6,462,647, entitled "Recharegable Active Transponder", issued Oct. 8, 2002, discloses an active transponder including an antenna for exchanging a radioelectric signal, processing means, an accumulator able to supply a first power supply signal (V1), and storage means able to store the power originating from the received radioelectric signal, and to supply a second power supply signal (V2). This transponder further includes: two means for comparing the two power supply signals to a minimum threshold (Vmin) and, in response, providing two control signals (V3, V4); and charging means controlled by the two control signals, so that the accumulator can be charged, via the charging means, from the stored power. One advantage of such a transponder is that the accumulator can be automatically recharged, as soon as the latter is no longer sufficiently charged to assure the functions of the transponder.

2. USPAP 2002/0106988 entitled "Signaling System And A transponder For Use In The System", published Aug. 8, 2002, discloses a signaling system includes a plurality of active transponders, an interrogation station and a source of switching signals. Each of the transponders has a microcontroller, a radio transceiver for responding to radio interrogation signals from the interrogation station, the radio transceiver being coupled to the controller by way of switching means which switches the transceiver on or off whilst leaving the microcontroller active, and a passive receiver for receiving switching signals from the source of switching signals, which signals are used by the microcontroller for switching-on or -off the transceiver. Transducers may be coupled to the microcontroller for monitoring environmental features, such as ambient temperature and humidity, and data relating to the features is stored in a RAM in readiness to be relayed to storage means in the interrogation station as and when required. Signals received by the passive receiver enable the radio transceiver to be de-activated in locations, such as in an aircraft, where spurious radiation from the transponder is not permitted and to be re-activated when removed from such a location.

3. USPAP 2003/0030542 entitled "PDA Security System", published Feb. 13, 2003, discloses a personalized security system for use with a PDA or other portable electronic device. An interrogator signal is transmitted from the portable electronic device, triggering a responsive transmission of a password from an electronic key carried by the wearer. Certain selected functions or all functions of the electronic device are therefore only enabled if the electronic device is within a predetermined operating proximity of the electronic key. Also disclosed is a personal preference monitoring system, for allowing personal preferences to be automatically implemented in response to a user passing within a predetermined distance of an interrogation signal transmitter.

None of the cited art discloses, suggest or teaches an indicating RF-ID tag, preferably self-powered, that provides an event indicating the tag has been successfully or unsuccessfully interrogated by a reader for data transmission, where the event may include voice, light, vibration, odor, change in shape, or different combinations of event indicators.

SUMMARY OF INVENTION

To overcome limitations in the prior art described above, and to overcome other limitations that will be apparent upon reading and understanding the present specification, the present invention, in one embodiment, discloses a tag, typically a passive device including an antenna linked to a processing capable unit, such as a micro processor and a memory. The memory contains stored information identifying the tag and providing other information related to the tag. A light emitting device (LED) is connected in parallel with the microprocessor and memory as an indicator circuit. A reader transmits electromagnetic energy received by the tag antenna when within the reader transmission zone. The energy in the carrier signal is sufficient for the tag to transmit information from the memory to the reader. As the tag is read by the reader, the data stream includes a few bytes at the end to indicate the reading was successful. When the reader does not have or provide an indication that the tag transmission has been successful, the reader transmission includes sufficient energy to cause a physical even to occur at the tag, e.g. the illumination of the LED providing a tag indication that a successful tag transmission has occurred.

In another embodiment, the reader transmits an RF signal to the tag when a successful read has been completed for the tag transmission. The RF signal received by the tag is directed to the tag microprocessor which directs stored energy in the tag to cause a physical event to occur providing a tag indication that a successful tag transmission has occurred.

In another embodiment, the reader may write information into the tag and the tag provides a physical event confirming a successful or unsuccessful read operation.

In still another embodiment, a near field communication involves contact, directly or indirectly, between the tag and the reader. A transfer of information can occur between the reader and the tag according to such contact enabling the user to have instant feedback of goods and services accessible through the reader.

In one aspect of the invention, a physical event generated at the tag in response to a successfully interrogation of the tag by a reader may include voice, light, color, vibration, odor, changing tag shape, or different combinations of tag indicators.

Another aspect is a physical event generated by a tag may be based upon touch power, swipe direction, device orientation.

Another aspect is a tag generating a physical event based upon received or stored energy when its contents have been successfully interrogated by a reader.

Another aspect is a reader transmission to the tag indicating a successful tag transmission.

Another aspect is dedicated logic in the tag for initiating a transmission to a reader indicating a proper interrogation signal has been received in terms of frequency and energy from the reader transmission.

Another aspect is storing energy in the tag from environmental sources including solar, mechanical changes, temperature differences.

Another aspect is storing in the tag memory a type and service indication, such that a reader can quickly determine if the tag should be read in whole, in part or not at all.

Another aspect is linking several tags together served by a single indicating device, such that the reading of any one of the linked tags activates the indicating device.

DESCRIPTION OF DRAWING

These and other objects and aspects will be more fully apprehended from the following detailed description of the invention in a preferred embodiment, taken in conjunction with an appended drawing, in which.

DESCRIPTION OF PREFERRED EMBODIMENT

Figure 1:
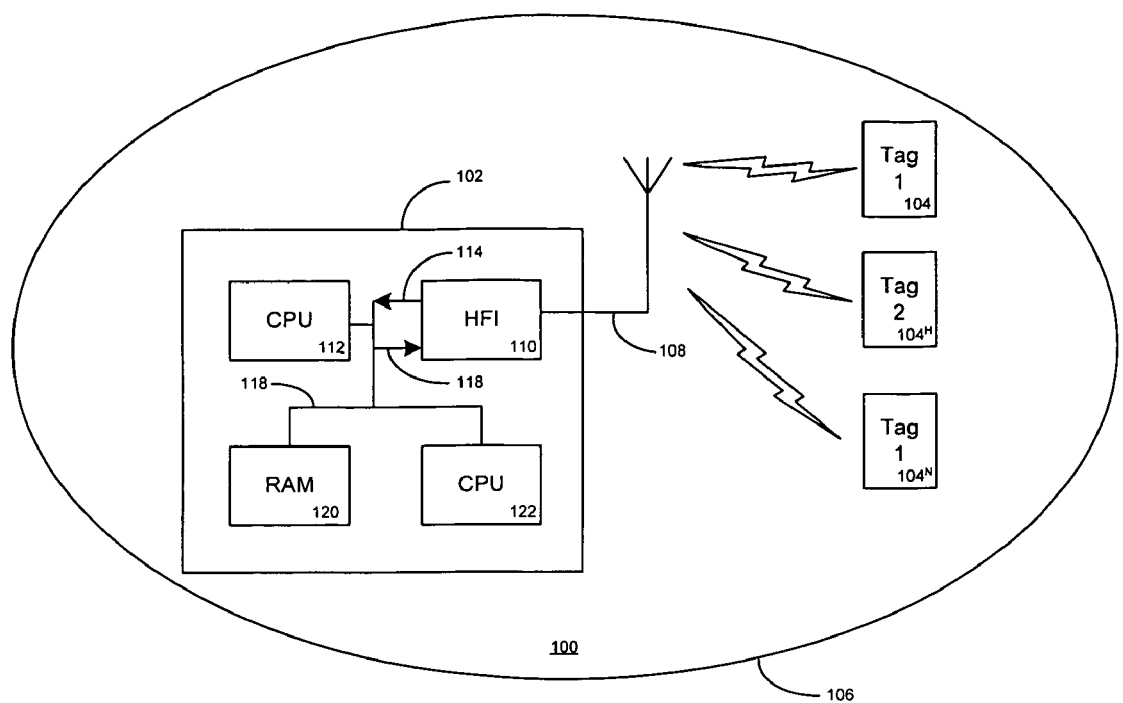
FIG. 1 is a representation of a reader and one or more tags in an RF-ID environment incorporating the principles of the invention.

In FIG. 1, a RF-ID system 100 includes a reader 102 for contacting one or more tags $104^1$, $104^2$ ... $104^N$ installed in products, goods, etc., and within a reader transmission zone 106. The reader contacts the tags, via inductive coupling using radio frequency (RF) transmission. Typically, the tags do not contain a power supply and draw their energy from the electromagnetic energy in the RF transmissions. The operating frequency of the RF-ID system is the transmission frequency of the reader, typically 13.56 MHz. In response to a reader interrogation, the transmission frequency of the tag is usually the same as the reader, but at a much less power level. The tag transmission for sending data to the reader can occur by several transmission processes including backscatter or reflection or load modulation where the reader field is influenced by the tag. Further details on the interaction of the reader and a tag are described in the text "RFID Handbook" by K. Finkenzeller, John Wiley & Sons, New York, N.Y., 1999, (ISBN 0-471-98851-0), pages 20-27, fully incorporated herein by reference.

The reader 102 includes an antenna 108 for RF transmissions to the tags within the transmission zone 106. The antenna is coupled to a high frequency interface (HFI) 110 consisting of a transmitter and receiver (not shown), which activate the tag by RF transmissions, modulate the reader transmission signal to send data to the tag and demodulate received tag signals and data. The HFI is connected to a central processing unit 112 via an input path 114 and an output path 116 both connected to a bus bar 118. The processing capable unit is further connected to a dynamic memory device 120, such as for example a random access memory (RAM) storing programs for controlling the operation of the reader in executing the transmission, and reception functions in the transfer of data between the reader and the tags. A memory device 122, typically a non-volatile device or read only memory (ROM) stores the data transferred between the reader and the respective tags. An interrogation signal is generated and transmitted to the tags by the reader using amplitude or frequency or phase shift keying of the RF carrier. Additional details on the construction and operation of the reader are described in the "RFID Handbook, supra, pages 202-204.

Figure 1A:
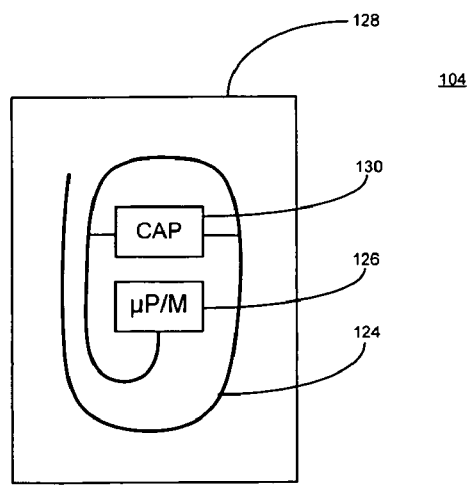
FIG. 1A is a representation of a tag device in FIG. 1.

The tag devices 104, shown in FIG. 1A, comprises an electronic coil 124 functioning as an antenna and an integrated circuit chip 126 fabricated on a substrate 128. A capacitance unit 130 maybe connected in parallel with the coil to form a resonant circuit with a resonant frequency corresponding to the RF transmission frequency. The chip contains a processor unit and a memory region (See FIG. 2). The reader RF field links to the coil and a voltage is generated in the coil by induction. The resonant coil provides a step-up in the inductively coupled voltage sufficient for transmission purposes. The tag recognizes and responds to the reader interrogation signal. The energy captured in the coil is sufficient to download and transmit information in the memory to the reader. Energy is also captured in the microchip capacitance for operation of a tag indicator circuit (FIG. 2).

Figure 2:
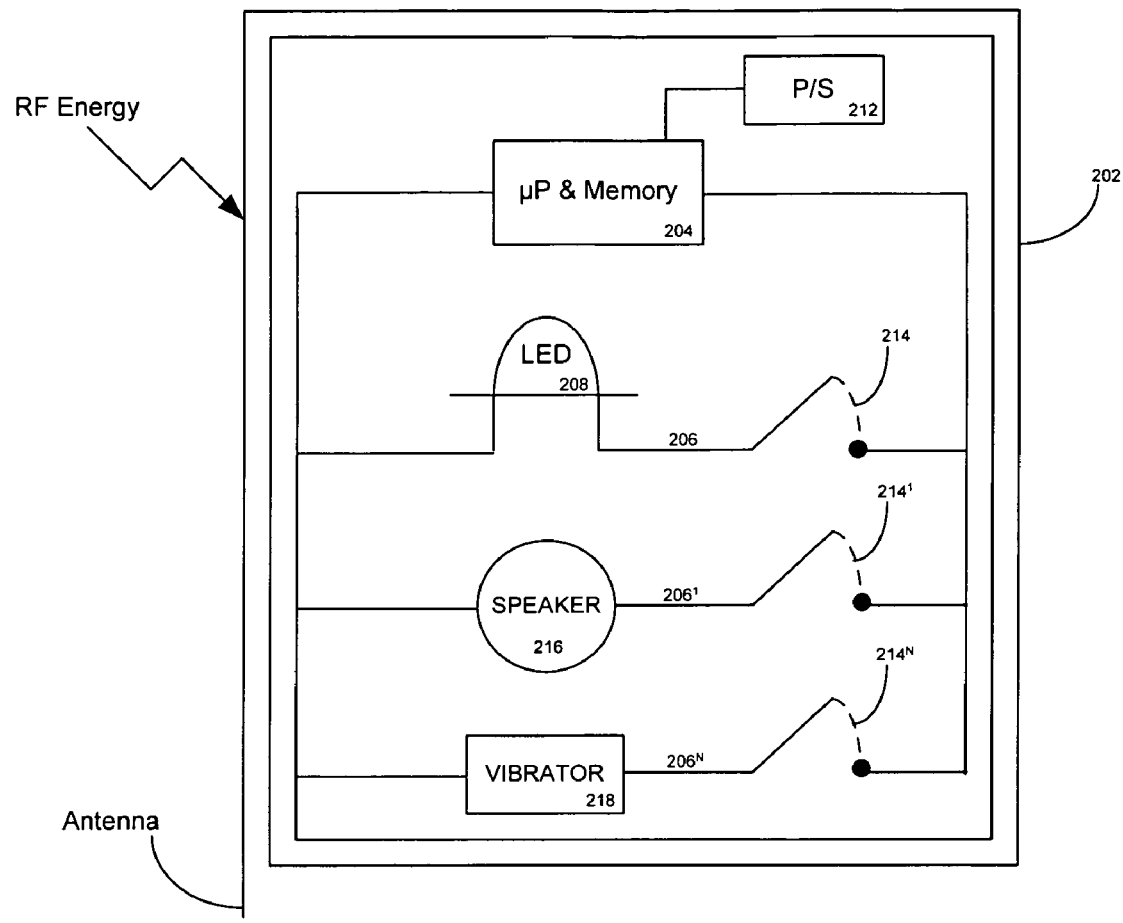
FIG. 2 is a representation of a tag in the RF-ID environment of FIG. 1.

FIG. 2 shows one embodiment of the invention providing a tag indication to a user when a successful transmission of data occurs from a tag 200 to the reader (FIG. 1) in response to an interrogation signal transmitted by the reader to the tag in the transmission zone 106 (See FIG. 1). The tag 200 includes a coil 202 connected to a microprocessor/memory chip 204 in a resonant circuit. An indicator circuit 206, in one embodiment, includes a light emitting diode 208 in parallel with the chip 204 to provide a physical event at the tag, i.e. illumination of the LED when a successful downloading of data to the reader has occurred. A blocking diode may be included in the indicator circuit as appropriate. A choice of LED colors maybe available for selection by the processor. The tag may include a plurality of indicator circuits $206^1$, $206^2$, and $206^N$, each including a switch 214, normally open. The switches are programmably controlled by the processor to achieve combinations of physical events when a successful transmission of data has occurred. For example, by closing switches 214 and $214^1$ a speaker 216 in the indicator circuit $206^1$ and the LED 208 may be activated to announce and display a successful transmission. A vibrator or an odor dispensing device 218 in indicator circuit $206^N$ maybe activated with indicator circuit $206^1$ to announce and provide a sensory signal indicating a successful transmission of data. The closing of the switches directs energy stored in the microchip via capacitance, vibrations or temperature differences to activate the device and provide a physical event as feedback regarding the status of the tag. Alternatively, the tag may include a power source 212, e.g. an electrochemical device to provide energy for activating the physical event. The power source maybe recharged via solar energy. According to embodiments of the present invention, the LEDs may indicate by color whether the tag reading has been successful ounsuccessful. For example, if the reading has been performed successfully, a green LED may be activated and alternatively if the tag reading has not been successful, a red LED may be activated. The necessary energy for indication may be gathered even in cases where the actual tag reading operation is not successful.

In operation, a reader interrogation signal supplies sufficient energy to the coil 202 to activate the microchip processor and store energy in the microchip capacitance. The microchip recognizes the interrogation signal and downloads information stored in the memory for transmission to the reader using the energy stored in the coil 202. The microchip processor adds a few bytes at the end of transmitted data to indicate that a successful reading and transmission of the stored data has occurred. After the transmitted tag data has occurred, the magnetic field goes off, and the capacitance energy stored in the chip is used to activate an indicator circuit(s) by programmably closing switches 214 to provide at least one physical event at the tag indicating a successful transmission of tag data to the reader has occurred. In the present instance, the LED, is illuminated by the stored energy, after closing the switch 214 by the processor, the illumination of the LED indicating at the tag a successful data transmission has occurred from the tag to the reader. The tag may be connected to several other tags. One of the tag provides a physical event when any of the connected tags are interrogated and a successful transmission occurs The reader may also provide the tag an indication of a successful transmission of tag data by performing a service in response to the tag data.

When a reader desires to write information into a tag within the transmission zone, a write signal is transmitted to and recognized by the tag as instruction to prepare to receive and read new data from the reader, which may be in lieu of a read operation or after a read operation. The reader delays a short period to allow the processor capable unit to prepare the memory to receive, read and store the new data which may overwrite or supplement the stored data. After the delay period, the reader transmits the data which is read by the tag, processed by the processor capable unit and stored in the memory, according to a first code in the data indicating overwriting of the tag contents or a second code in the data indicating the data supplements the tag contents for subsequent transmission when the tag is interrogated by a reader. Upon a successful read operation, the processor capable unit activates an indicator circuit to provide a physical event indicating a successful read operation using the energy stored in the tag or provided by the power supply. Alternatively, the processsor capable unit may indicate an unsuccessful read operation by the color of the LED.

Figure 3:
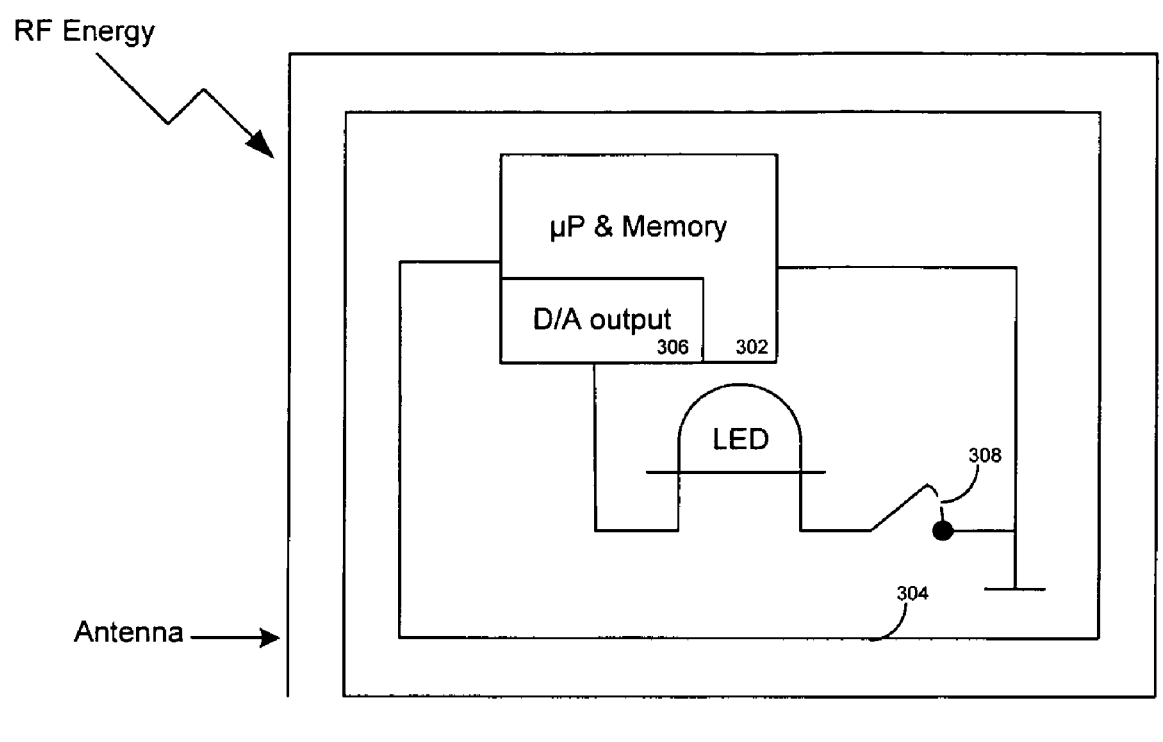
FIG. 3 is a representation of a tag in another RF-ID environment of FIG. 1.

FIG. 3 shows another embodiment for indicating at the tag a successful transmission of data has occurred from a tag to a reader. A tag 300 transmits stored data in the micro processor and memory chip 302, after interrogation by the reader, as outlined for FIG. 2. The reader recognizes the bits at the end of the tag transmission and sends an OK signal to the tag. The tag micro processor recognizes the OK signal and triggers the capacitance energy stored in the micro chip to the indicator circuit 304 via a digital/analog (D/A) port 306. The stored energy initiates a physical event at the tag by the activation of one or more indicator circuits via a switch 308 in each indicator under the control of the processor.

Figure 4:
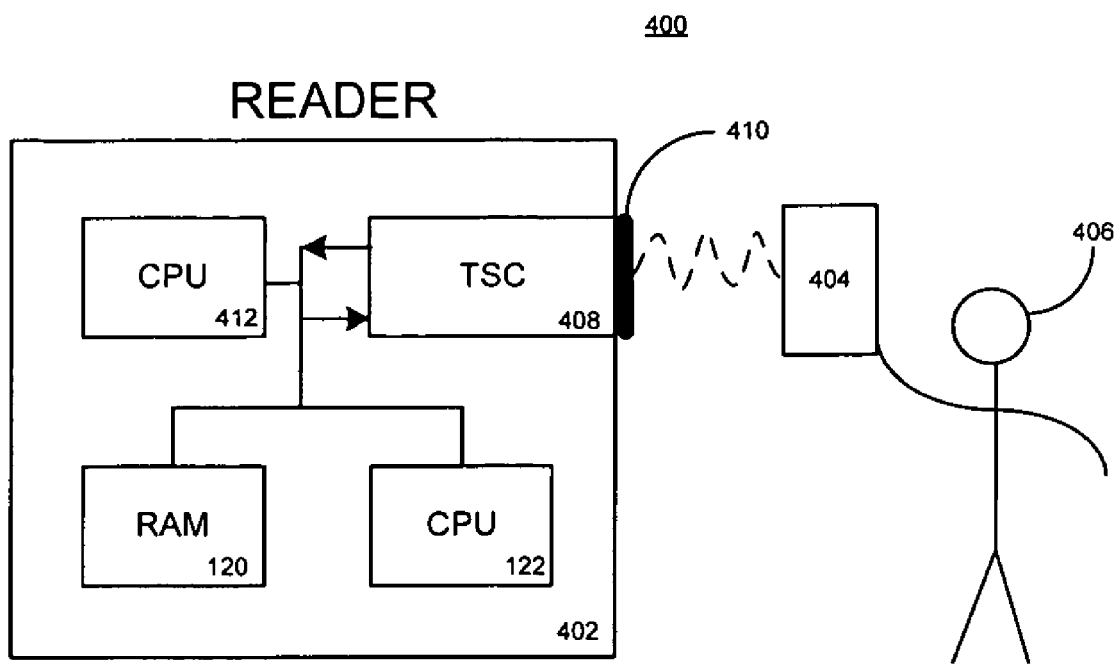
FIG. 4 is a representation of a reader and a tag held by a user in a near field communication environment, according to the principles of the present invention.

FIG. 4 shows a selectable tag event by a reader for a user at a sales point in a near field communication environment 400. A reader 402 and a tag 404 held by a user 406 interact at close range within 1 meter. The reader 402 includes a transceiver 408, the outer surface 410 serving as an antenna for interacting with the tag. The transceiver is connected to a processor 412. When the tag is waved past or actually touches the reader, they interact in the manner described in FIG. 2. The interaction provides the user instant feedback of services available at the reader via a physical event(s) occurring at the tag.

Figure 5:
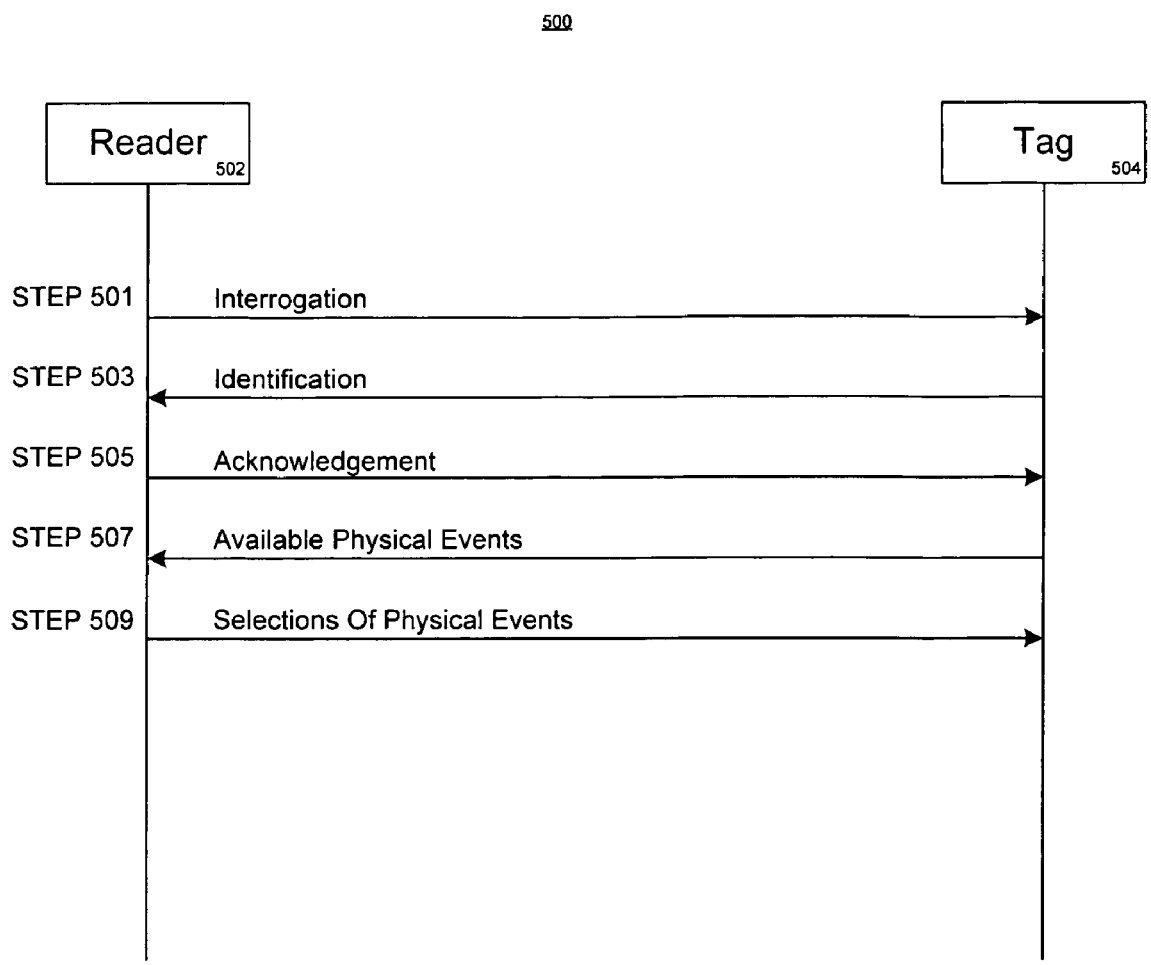
FIG. 5 is a process for implementing the near field environment of FIG. 4.

FIG. 5 describes a process 500 for implementing the near field communication environment of FIG. 4. A reader 502 provides a tag 504 selectable physical events, indicative of available goods and services, as follows:

Step 501: The reader initiates communication with the tag after the tag is waved past or actually touches the reader, as outlined in FIGS. 2 and 4.

Step 503: The induced energy in the tag may vary according to the touch power from the waving past or contact with the reader by the user causing stored data identifying the tag to be transmitted to the reader.

Step 505: The reader transmits an OK signal to the tag indicating a successful identification of the tag to the reader.

Step 507: The tag using the transmission energy sends a list of physical events and methods available at the tag via the indicator circuits, including different LED colors.

Step 509: The reader sends data to the tag selecting one or more physical events providing a user instant feedback of services, products at or from the reader, according to the user touch power.

The present invention solves the problem of providing an output indication when a reader does not have an output feature indicating a RF-ID tag read action has been completed. Without such indication, there could be unnecessary delay in providing goods and services available to a user. The physical events occurring at the tag provide the user with instant feedback of services, goods available at the reader.

While the invention has been described in terms of a preferred embodiments, various changes can be made therein without departing from the spirit and scope of the invention, as defined in the appended claims, in which:

We claim:

1. An indicating tag comprising:
   an integrated micro chip including a processor and a memory coupled together, the memory configuring for storing data descriptive of tag contents;
   an inductive coil coupled to the integrated micro chip and configured for providing a source of energy when electromagnetically energized via an input signal received from an external source;
   at least one indicator circuit coupled to the integrated micro chip configured for providing a list of available physical events for indicating successful operation in response to the received input signal; wherein
   the indicator circuit including an element configured for providing a feedback event indicating a successful reading operation of the tag contents in response to receiving an indication signal from the external source upon a successful read operation.

2. The indicating tag of claim 1 further comprising a switch element in the indicator circuit responsive to the processor for activating the indicator circuit.

3. The indicating tag of claim 1 further comprising means for registering at least one physical event from the list of available physical events provided to the indicating tag.

4. The indicating tag of claim 3 further comprising means for directing the stored energy in the micro chip to the indicating circuit in response to the input signal indicating a successful reading operation of the tag contents has occurred.

5. The indicating tag of claim 2 further comprising a plurality of indicating circuits programmably controlled by the processing capable unit via the switches to provide combinations of feedback events in response to the input signal.

6. The indicating tag of claim 1 wherein the tag is a passive RF-ID device.

7. The indicating tag of claim 1 wherein the element is at least one of a source of light, source of color, source of sound, source of vibration and source of odor.

8. An RF-ID system comprising:
   a) a reader transmitting interrogation signals in a transmitting zone for detecting tags within the zone;
   b) at least one indicating tag within the zone generating an identifying signal and transmitting data to the reader, the data including a list of available physical events at the tag in response to the interrogation signal; and
   c) feedback means in the indicating tag actuating a physical event at the tag when the data has been successfully transmitted.

9. The RF-ID system of claim 8 further comprising:
   d) an acknowledgement signal generated and transmitted to the indicator tag by the reader for initiating a selected physical event from the list when the data has been successfully transferred to the tag.

10. The RF-ID system of claim 9 further comprising:
    e) tag means responsive to the acknowledgement signal for activating the feedback means.

11. The RF-ID system of claim 8 further comprising:
    reader means for interrogating the indicating tag to determine whether stored data therein is supported by the reader.

12. The RF-ID system of claim 8 further comprising:
    d) means adding to the transmitted data an indication that the data has been successfully transmitted to the reader.

13. The RF-ID system of claim 8 wherein the physical event includes at least one of light or color or sound or vibration or odor or mechanical change of shape indicating a successful transfer of information from the indicator tag to the reader.

14. The RF-ID system of claim 8 wherein the indicator tag is a passive device having no power source.

15. The RF-ID system of claim 8 further comprising:
    i) means for combining physical events in the indicator circuits when a successful transfer of data has occurred from the indicating tag to the reader.

16. A method, comprising:
    a) receiving an interrogation signal;
    b) recognizing the interrogation signal and generating a response signal for transmitting stored data to a reader device including a list of available physical events; and
    c) energizing an indicator circuit from reader input signal to provide a physical event indicating successful transmission of data to the reader.

17. The method of claim 16 further comprising:
    f) transmitting an acknowledgement signal from the reader to the tag indicating a successful transmission of data has occurred.

18. The method of claim 17 further comprising:
    i) providing a physical event at the indicating tag corresponding to the selected physical event as feedback to a user that a successful reading operation of the tag has occurred by the reader.

19. The method of claim 16 further comprising:
    j) providing light or color or sound or vibration or odor at the indicating tag when a successful transfer of data has occurred from the tag to the reader.

20. The method of claim 16 further comprising:
    l) combining physical events at the tag as feedback upon the successful transfer of data from the indicating tag to the reader.

21. A recording medium containing program code, executable in a computer, the recording medium comprising:
    program code for receiving an interrogation signal at an indicating tag;
    program code for recognizing the interrogation signal by the indicating tag and transmitting stored data, the tag providing a list of available physical events for indicating successful operation to a reader; and program code for energizing an indicator circuit included in the indicating tag in response to receiving an input signal to provide a physical event at the tag indicating the successful transmission of data occurred at the indicating tag.

22. The medium of claim 21 further comprising:
program code for transmitting a selection of physical events supported by a receiver for the tag.

23. The medium of claim 21 further comprising:
program code for receiving an acknowledgement signal indicating a successful transmission of data has occurred.

24. The medium of claim 22 further comprising:
program code for providing a physical event at the indicating tag corresponding to the selected physical event as feedback to a user that a successful reading operation of the tag has occurred.

25. The medium of claim 21 further comprising:
program code for providing light or color or sound or vibration or odor at the indicating tag when a successful transfer of data has occurred from the tag.

26. The medium of claim 21 further comprising:
program code for combining physical events at the tag as feedback upon the successful transfer of data from the indicating tag.

27. Apparatus, comprising:
a) an integrated micro chip including a processor capable unit and a memory coupled together as a tag for reading and writing operations, the memory storing data descriptive of tag contents;
b) an inductive coil coupled to the integrated chip and providing a source of energy when electromagnetically energized via a read signal or a write signal; the tag providing a list of available physical events for indicating successful read operation to an external source in response to the read or write signal; and
c) at least one indicator circuit on the tag and coupled to the integrated chip, the circuit including an element providing a feedback event at the tag when the tag contents are successfully altered in response to the read or write signal.

28. The indicating tag of claim 27 further comprising:
a first code in the write signal indicating overwriting the tag contents in the memory.

29. The indicating tag of claim 27 further comprising:
a second code in the write signal indicating tag contents are supplemented.

30. A method, comprising:
a) including a processor and a memory coupled together in an integrated micro chip for reading and writing operations as a tag, the memory storing data descriptive of tag contents, the integrated chip configured for;
b) receiving an interrogation signal;
c) responding to the interrogation signal via coupling an inductive coil to the integrated chip and providing a source of energy when electromagnetically energized via a read signal or a write signal, the tag providing a list of available physical events for indicating successful read operation to an external source in response to the read or write signal;
d) coupling at least one indicator circuit to the integrated chip;
e) receiving an indication of a successful read operation; and
f) energizing at least one indicator circuit as a feedback event at the tag when the tag contents are successfully transmitted in response to a read signal or when the tag contents are successfully altered in response to the write signal.

31. The method of claim 30 further comprising:
including a first code in the write signal indicating overwriting the tag contents in the memory.

32. The method of claim 30 further comprising:
including a second code in the write signal indicating tag contents are supplemented.

33. An RF-ID system comprising:
a) a reader transmitting interrogation signals in a transmitting zone for detecting tags within the zone, the reader providing read signals for reading tag contents and write signals for altering tag contents;
b) at least one indicating tag within the zone generating an identifying signal and transmitting data to the reader in responsive to the read signal or altering tag contents in response to the write signal, the tag providing a list of available physical events for indicating successful read operation to an external source in response to the read or write signal; and
c) feedback means in the indicating tag providing a physical event at the tag when the data has been successfully transmitted or the tag contents altered.

34. The system of claim 33 further comprising:
d) a first code in the write signal indicating overwriting the tag contents.

35. The method of claim 34 further comprising:
e) a second code in the write signal indicating tag contents are supplemented.

36. A recording medium containing program code, executable in a computer, the recording medium comprising:
a) program code for receiving read or write signals at an indicating tag;
b) program code for recognizing the read signal by the indicating tag and transmitting tag contents, the tag providing a list of available physical events for indicating successful read operation to an external source in response to the read or write signal;
c) program code for recognizing the write signal by the indicating tag and altering tag contents in response of the recognition;
d) program code for energizing an indicator circuit on the tag from the read signal to provide a physical event at the tag indicating the successful transmission of data occurred at the indicating tag; and
e) program code for energizing the indicator circuit on the tag from the write signal to provide a physical event at the tag indicating successful altering of the tag contents occurred at the indicating tag.

37. The medium of claim 36 wherein a first code in the write signal indicates overwriting the tag contents.

38. The medium of claim 37 wherein a second code in the write signal indicates tag contents are supplemented.

* * * * *

UNITED STATES PATENT AND TRADEMARK OFFICE
CERTIFICATE OF CORRECTION

| | |
|---|---|
| PATENT NO. | : 7,400,250 B2 |
| APPLICATION NO. | : 11/117333 |
| DATED | : July 15, 2008 |
| INVENTOR(S) | : I. Kansala |

It is certified that error appears in the above-identified patent and that said Letters Patent is hereby corrected as shown below:

Column 7, Line 57, change "circuits programmably" to --circuits configured to be programmably--;

Column 7, Line 58, change "processing capable unit via" to --processor--;

Column 7, Line 62, change "is at" to --is configured to provide at--;

Column 8, Line 28, change "the indicator" to --the at least one indicating--;

Column 8, Line 41, change "reader" to --reader device--;

Column 8, Line 43, change "transmitting" to --receiving--;

Column 8, lines 43 and 44, change "reader to the tag indicating" to --reader device indicating--;

Column 8, Line 46, change "17" to --16--;

Column 8, Line 47, Delete "at the indicating tag";

Column 8, Lines 52 and 53, Delete "at the indicating tag";

Column 8, Line 56, Delete "at the tag";

UNITED STATES PATENT AND TRADEMARK OFFICE
CERTIFICATE OF CORRECTION

PATENT NO.       : 7,400,250 B2
APPLICATION NO.  : 11/117333
DATED            : July 15, 2008
INVENTOR(S)      : I. Kansala It is certified that error appears in the above-identified patent and that said Letters Patent is hereby corrected as shown below:

Column 8, Lines 57-58, Delete "from the indicating tag to the reader"; and

Column 10, Line 29, change "event at" to --event occurring at--.

Signed and Sealed this

Seventh Day of October, 2008

JON W. DUDAS
*Director of the United States Patent and Trademark Office*